No. 727,499. PATENTED MAY 5, 1903.
M. K. VAN DER VELDE.
STEAM BOILER.
APPLICATION FILED AUG. 8, 1902.
NO MODEL. 2 SHEETS—SHEET 1.
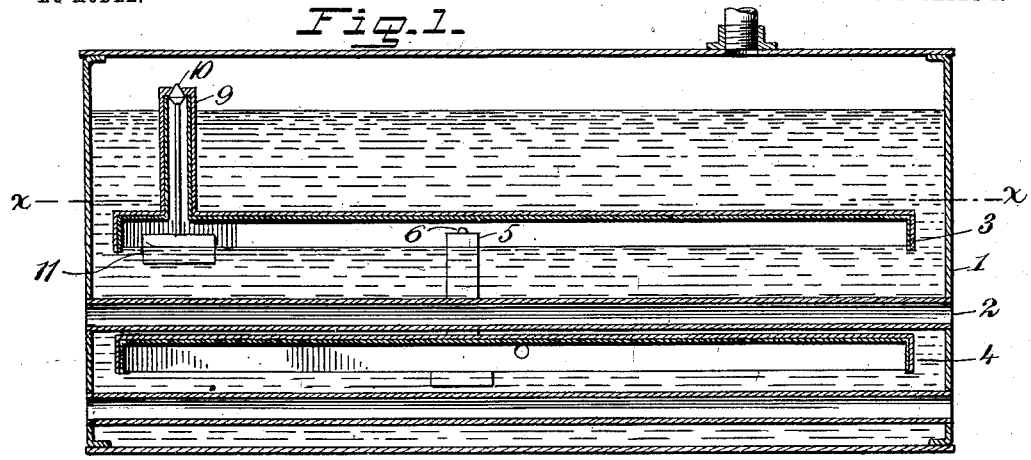
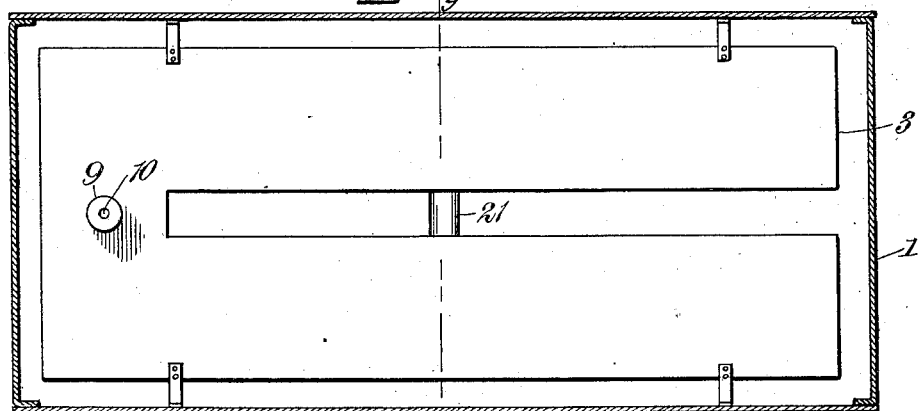
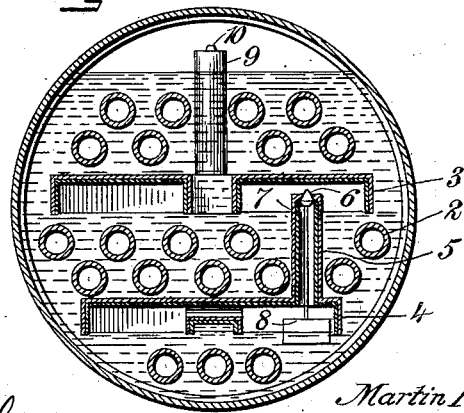
WITNESSES:
James P. Duhamel
C. R. Ferguson
INVENTOR
Martin Koops van der Velde
BY
ATTORNEYS.

No. 727,499. PATENTED MAY 5, 1903.
M. K. VAN DER VELDE.
STEAM BOILER.
APPLICATION FILED AUG. 8, 1902.
NO MODEL. 2 SHEETS—SHEET 2.
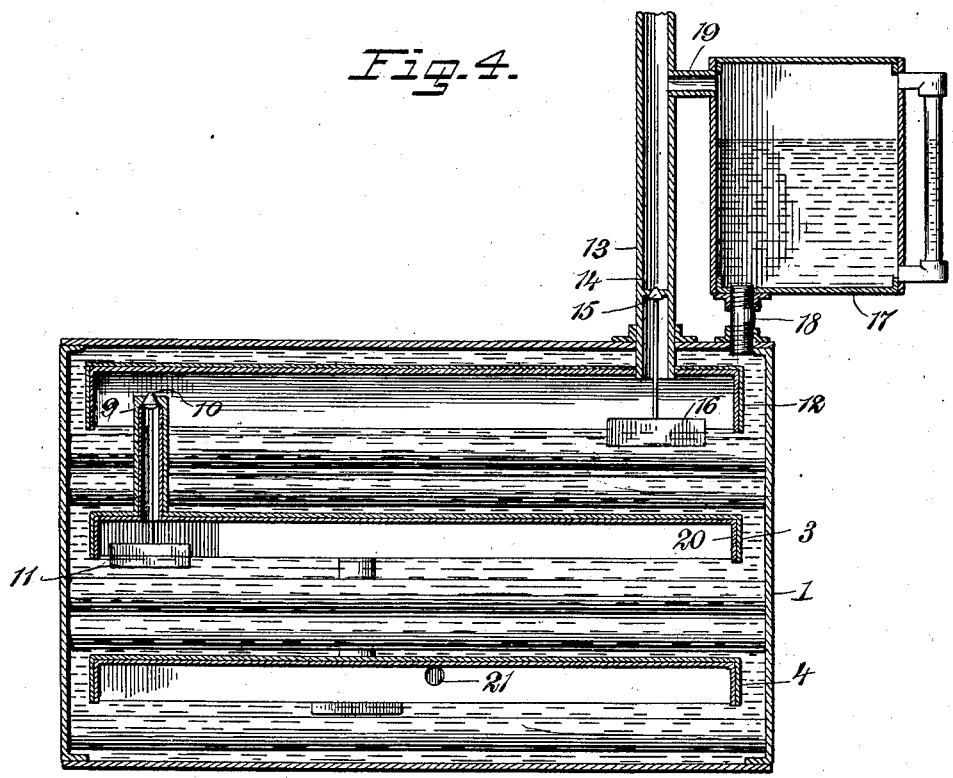
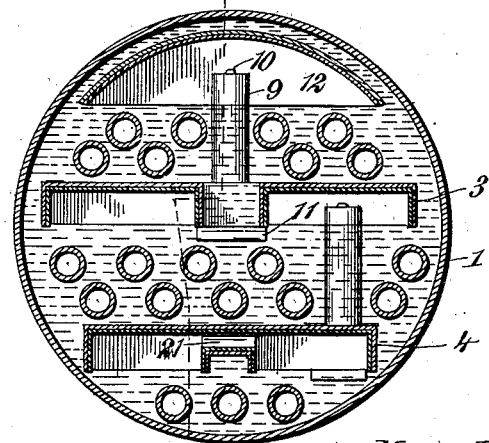
WITNESSES:
James F. Duhamel
C. R. Ferguson
INVENTOR
Martin Koops van der Velde
BY
ATTORNEYS.

No. 727,499. Patented May 5, 1903.

UNITED STATES PATENT OFFICE.

MARTIN KOOPS VAN DER VELDE, OF CHICAGO, ILLINOIS.

STEAM-BOILER.

SPECIFICATION forming part of Letters Patent No. 727,499, dated May 5, 1903.

Application filed August 8, 1902. Serial No. 118,930. (No model.)

*To all whom it may concern:*

Be it known that I, MARTIN KOOPS VAN DER VELDE, a citizen of the United States, and a resident of Chicago, in the county of Cook and State of Illinois, have invented a new and Improved Steam-Boiler, of which the following is a full, clear, and exact description.

My invention relates to improvements in boilers for generating steam, the object being to provide a suitable means to cause in the boiler a series of water-levels, thus increasing the area of steam-supply.

I will describe a steam-boiler embodying my invention and then point out the novel features in the appended claims.

Reference is to be had to the accompanying drawings, forming a part of this specification, in which similar characters of reference indicate corresponding parts in all the figures.

Figure 1 is a sectional elevation of a boiler embodying my invention. Fig. 2 is a section on the line $x\ x$ of Fig. 1. Fig. 3 is a section on the line $y\ y$ of Fig. 2. Fig. 4 is a section on the line $z\ z$ of Fig. 5, and Fig. 5 is a transverse section thereof.

Referring to the drawings, 1 designates a boiler having the usual flues 2. Arranged in the boiler are casings in the form of inverted pans 3 4, one arranged above the other. As shown in Fig. 2, each pan consists of two sections or chambers communicating one with the other, the sections being separated, so as to permit the passage of water between them in the boiler.

From the lower pan 4 a tube 5 extends upward into the pan 3 and above the water-level thereof. In the outlet of the tube 5 is a valve 6, the stem 7 whereof extends upward from a float 8. A cylinder-tube 9 extends upward from the pan 3 to a point above the water-level in the boiler, and in this tube is a valve 10, which is also connected to a float 11.

In Figs. 4 and 5 the arrangement is similar to that above described; but in addition to the pans 3 and 4 I employ another pan 12 above the pan 3, and the tube 9 extends into this pan 12 above the water-level thereof. From the pan 12 a steam-pipe 13 extends, and arranged in this steam-pipe 13 is the valve-seat 14 for a valve 15, the stem of which connects with a float 16. This form of boiler is designed for use in factories or the like, and it is provided with a heating-drum 17 for the preliminary heating of feed-water, which passes from the drum to the boiler through a pipe 18. This drum 17 also connects with the steam-pipe 13 through a tube 19. Each of the pans is preferably provided with a lining 20, of asbestos. The members of the lower pan are connected at about the center by a tube 21.

In operation the steam will be generated on the several surfaces or levels of water, and the steam generated in the pan 4 will force the water downward, consequently moving the float 8 down and opening the valve, so that the generated steam may pass into the pan 3, and this steam, with the steam generated in said pan 3, will cause the valve 10 to open, permitting the steam to pass into the upper space of the boiler, as shown in Figs. 1, 2, and 3, or into the space in the pan 12, (shown in Figs 4 and 5,) and thence out through the steam-pipe.

Having thus described my invention, I claim as new and desire to secure by Letters Patent—

1. The combination with a boiler, of a series of open-bottom or inverted pans secured therein one above another, each pan consisting of communicating sections, pipe connections leading from one pan to another, and valves in said pipe connections.

2. The combination with a steam-boiler, of open-bottom or inverted pans secured therein, a pipe leading from one pan to another, a valve for controlling the outlet of said pipe, a float supporting said valve, a steam-outlet pipe, a valve for controlling said outlet, a float to which the said valve is connected, and the heating-drum communicating with the boiler and with the steam-pipe.

3. The combination with a steam-boiler, of a series of inverted pans secured therein, the pans consisting of two sections communicating one with the other, pipes leading from one pan to another, and float-supported valves for controlling the outlet of the pipes.

In testimony whereof I have signed my name to this specification in the presence of two subscribing witnesses.

MARTIN KOOPS VAN DER VELDE.

Witnesses:
PETER W. HOLLEMAN,
NELLIE PRINCE.